US010727513B2

(12) United States Patent
Knight et al.

(10) Patent No.: US 10,727,513 B2
(45) Date of Patent: Jul. 28, 2020

(54) MODULAR FUEL CELL SYSTEMS AND METHODS

(71) Applicants: Parker-Hannifin Corporation, Cleveland, OH (US); Watt Fuel Cell Corp., Port Washington, NY (US)

(72) Inventors: Steven Robert Knight, Killingworth, CT (US); Caine Finnerty, Port Washington, NY (US); Paul Dewald, Glen Cove, NY (US)

(73) Assignees: WATT Fuel Cell Corp., Mount Pleasant, PA (US); Parker-Hannifin Corporation, Cleveland, OH (US)

(*) Notice: Subject to any disclaimer, the term of this patent is extended or adjusted under 35 U.S.C. 154(b) by 1041 days.

(21) Appl. No.: 14/768,672

(22) PCT Filed: Feb. 18, 2014

(86) PCT No.: PCT/US2014/016919
§ 371 (c)(1),
(2) Date: Aug. 18, 2015

(87) PCT Pub. No.: WO2014/127361
PCT Pub. Date: Aug. 21, 2014

(65) Prior Publication Data
US 2016/0006063 A1 Jan. 7, 2016

Related U.S. Application Data

(63) Continuation of application No. PCT/US2013/032664, filed on Mar. 15, 2013.
(Continued)

(51) Int. Cl.
*H01M 8/06* (2016.01)
*H01M 8/04* (2016.01)
(Continued)

(52) U.S. Cl.
CPC ..... *H01M 8/0618* (2013.01); *H01M 8/04007* (2013.01); *H01M 8/04014* (2013.01);
(Continued)

(58) Field of Classification Search
None
See application file for complete search history.

(56) References Cited

U.S. PATENT DOCUMENTS 5,741,605 A * 4/1998 Gillett ................ H01M 8/0625
429/415
6,743,536 B2 6/2004 Fuglevand
(Continued)

FOREIGN PATENT DOCUMENTS

EP 0 914 687 6/2002
EP 2 164 126 A1 3/2010
(Continued)

OTHER PUBLICATIONS

European Search Report for European Patent Application No. 17150716.3, dated Jul. 17, 2017 (5 pages).
(Continued)

*Primary Examiner* — Jonathan Crepeau
*Assistant Examiner* — Angela J Martin
(74) *Attorney, Agent, or Firm* — Goodwin Procter LLP

(57) ABSTRACT

A fuel cell module includes a fuel cell stack configured to produce an electrical output, power electronics circuitry configured to convert the electrical output of the fuel cell stack into a regulated output of the fuel cell module, module control electronics circuitry configured for communications within the fuel cell module and further configured for communications with master control electronics circuitry external to the fuel cell module, and a structure configured to connect together the fuel cell stack, the power electronics circuitry and the module control electronics circuitry as part
(Continued)

of the fuel cell module that is unitary, and further configured for the unitary fuel cell module to be insertable as a unit into a multi-module system chassis.

20 Claims, 12 Drawing Sheets

Related U.S. Application Data

(60) Provisional application No. 61/765,906, filed on Feb. 18, 2013.

(51) Int. Cl.
| | |
|---|---|
| *H01M 8/24* | (2016.01) |
| *H01M 8/0612* | (2016.01) |
| *H01M 8/04014* | (2016.01) |
| *H01M 8/249* | (2016.01) |
| *H01M 8/04007* | (2016.01) |
| *H01M 8/04701* | (2016.01) |

(52) U.S. Cl.
CPC ........ *H01M 8/249* (2013.01); *H01M 8/04738* (2013.01); *H01M 8/0612* (2013.01); *H01M 2250/405* (2013.01); *Y02B 90/16* (2013.01); *Y02P 90/40* (2015.11)

(56) References Cited

U.S. PATENT DOCUMENTS

| | | | |
|---|---|---|---|
| 7,261,962 B1 | 8/2007 | Czajkowski et al. | |
| 7,314,680 B2 | 1/2008 | Bai et al. | |
| 7,479,333 B2 | 1/2009 | Bai et al. | |
| 7,524,575 B2 | 4/2009 | Bai et al. | |
| 7,531,264 B2 | 5/2009 | Bai et al. | |
| 7,691,502 B2 | 4/2010 | Wallace et al. | |
| 8,003,268 B2 | 8/2011 | Smith | |
| 8,097,376 B2 | 1/2012 | Bai et al. | |
| 8,206,857 B2 | 6/2012 | Bai et al. | |
| 2004/0043274 A1* | 3/2004 | Scartozzi | H01M 8/04014 429/434 |
| 2004/0180253 A1* | 9/2004 | Fisher | H01M 8/2475 429/413 |
| 2004/0191591 A1* | 9/2004 | Yamamoto | B01B 1/005 48/127.9 |
| 2005/0271909 A1 | 12/2005 | Bai et al. | |
| 2005/0271910 A1 | 12/2005 | Bai et al. | |
| 2009/0186245 A1* | 7/2009 | Frank | H01M 8/04089 429/431 |
| 2011/0281185 A1 | 11/2011 | Sridhar et al. | |

FOREIGN PATENT DOCUMENTS

| | | | |
|---|---|---|---|
| EP | 246 39 45 | 6/2012 | |
| WO | 97-33333 | 9/1997 | |
| WO | 2009/051349 | 4/2009 | |
| WO | WO 2009051349 | * 4/2009 | .............. H01M 8/04 |
| WO | 2011-141307 | 11/2011 | |

OTHER PUBLICATIONS

International Search Report and Written Opinion for corresponding Patent Application No. PCT/US2014/016919 dated Jun. 6, 2014.
International Search Report and Written Opinion for corresponding Patent Application No. PCT/US2013/032664 dated Feb. 26, 2014.

* cited by examiner

MODULAR FUEL CELL SYSTEMS AND METHODS

RELATED APPLICATION

This application is a national phase of International Application No. PCT/US2014/016919 filed on Feb. 18, 2014 and published in the English language, which claims the benefit of PCT International Application No. PCT/US13/32664 filed on Mar. 15, 2013, which claims the benefit of U.S. Provisional Application No. 61/765,906 filed Feb. 18, 2013, both of which are hereby incorporated by reference in their entirety. International Application No. PCT/US2014/016919 also claims the benefit of U.S. Provisional Application No. 61/765,906 filed Feb. 18, 2013.

FIELD OF INVENTION

The present disclosure relates generally to fuel cells and particularly to a modular fuel cell system.

BACKGROUND

Conventional fuel cell systems generally lack expandability and thus, for the most part, systems are manufactured and sold in specific size (e.g., electrical power rating, heat output rating, and the like) units that are designed and manufactured for that specific size only. For example, a 1000 W system is typically designed and manufactured specifically as a 1000 W system. This creates issues at the manufacturing floor of lack of commonality of parts, stocking of non-common components, warehousing of specific size systems, and the like. Moreover, once built, these systems will operate only up to their maximum capacity without the possibility of expanding.

From a marketing point of view, conventional systems' lack of expandability is a challenge because it is difficult for such systems to adapt to consumers' rapidly changing demands for power output, form factor, and continuous improvement. Conventional systems generally do not have the ability to be upgraded in power rating or other features without the introduction of entirely new designs. This, of course, creates additional issues including issues of design certification and validation (e.g., safety certification), system testing, and the like. The undesirable results for the consumer and the manufacturer include longer times to market, increased costs and increased consumption of limited engineering resources.

Fuel cells are often used in combined heat and power (CHP) systems that provide, not only the electrical output of the fuel cell, but also garner heat produced by the fuel cell to provide a heat output. In conventional CHP systems, the heat output depends directly on the electrical output load of the fuel cell. This is a limitation, particularly in applications where a consistent heat output is desired.

SUMMARY OF INVENTION

The present disclosure provides fuel cell systems that are modular. The modular nature of the systems allows the manufacturer to design, test, certify and manufacture a single or reduced number of modules. The manufacturer can then use this reduced number of modules as common building blocks for a complete line of fuel cell systems of varying ratings and features. This allows for relatively short time to market and reduced costs on a new system of additional power rating or different features because the common building block is not required to be designed, tested or certified anew.

Also, the fuel cell systems disclosed herein can be operated as combined heat and power (CHP) systems where, not only are the fuel cell components modular, but a heater module is provided to break the dependence of the heat output of the CHP system from the electrical output. Modules, including fuel cell and heater modules, can be operated independently via a user interface to produce heat output only at a desired output level, electrical power with no additional heat output, or electrical output with additional heat output at a desired output level.

The modules can be provided to be self-sufficient in all aspects relating to power output (i.e., the modules can include all pumps, blowers, valves, power and control electronics, and the like) and specifically tailored for the rated power output with no wasted capacity. The modules can also be provided to be plug and play to the larger fuel cell system and/or a combined heat and power system.

According to one aspect of the present disclosure, a fuel cell module includes a fuel cell stack configured to produce an electrical output, power electronics circuitry configured to convert the electrical output of the fuel cell stack into a regulated output of the fuel cell module, module control electronics circuitry configured for communications within the fuel cell module and further configured for communications with master control electronics circuitry external to the fuel cell module, and a structure configured to connect together the fuel cell stack, the power electronics circuitry and the module control electronics circuitry as part of the fuel cell module that is unitary, and further configured for the unitary fuel cell module to be insertable as a unit into a multi-module system chassis.

In various embodiments, the fuel cell module includes a balance of plant including a device configured to exhaust a fluid carrying heat from the fuel cell stack, and a heat exhaust configured to receive at least some of the fluid carrying heat from the fuel cell stack and to exhaust the fluid carrying heat from the fuel cell stack to a system exhaust configured to receive the fluid carrying heat from the fuel cell stack and fluid carrying heat from other modules inserted in the multi-module system chassis.

In some embodiments, the fuel cell module includes a balance of plant including a device configured to exhaust a fluid carrying heat from the fuel cell stack, an afterburner configured to cause consumption of remnant gases from the fuel cell stack and to output a fluid carrying heat, and a heat exhaust configured to receive at least some of the fluid carrying heat from the fuel cell stack and at least some of the fluid carrying heat from the afterburner to exhaust the fluids to a system exhaust configured to receive the fluids from the fuel cell module and fluids from other modules inserted in the multi-module system chassis.

In certain embodiments, the fuel cell module includes an interface configured to connect the fuel cell stack to a fuel source transport, the module control electronics circuitry to the master control electronics circuitry, and the heat exhaust to the system exhaust.

In particular embodiments, dimensions of the fuel cell stack, the power electronics circuitry, the module control electronics circuitry, and the balance of plant each conform to an envelope for the unitary fuel cell module to be insertable as a unit into the multi-module system chassis.

In various embodiments, the fuel cell module includes a reformer configured to produce a hydrogen-rich reformate for use by the fuel cell stack.

In another aspect of the present disclosure, a fuel cell module includes functional blocks arranged stacked as a unit. The functional blocks include a fuel cell stack block configured to produce an electrical output, a power electronics block configured to convert the electrical output of the fuel cell stack into a regulated output of the fuel cell module, and a structure configured to connect together the fuel cell stack block and the power electronics block for the fuel cell module to be insertable into a multi-module system chassis.

In various embodiments, the fuel cell module includes a module control electronics block configured to communicate within the fuel cell module and further configured for communications with master control electronics circuitry disposed external to the fuel cell module but within the multi-module system chassis.

In some embodiments, dimensions of each of the functional blocks conform to an envelope defined in part by the structure such that the fuel cell module is insertable as a unit into the multi-module system chassis.

In certain embodiments, the fuel cell module includes a balance of plant including a device configured to exhaust a fluid carrying heat from the fuel cell stack block, and a heat exhaust configured to receive at least some of the fluid carrying heat from the fuel cell stack block and to exhaust the fluid carrying heat from the fuel cell stack block to a system exhaust configured to receive the fluid carrying heat from the fuel cell stack block and fluid carrying heat from other modules inserted in the multi-module system chassis.

In particular embodiments, the fuel cell module includes a balance of plant including a device configured to exhaust a fluid carrying heat from the fuel cell stack block, an afterburner configured to cause consumption of remnant gases from the fuel cell stack block and to output a fluid carrying heat, and a heat exhaust configured to receive at least some of the fluid carrying heat from the fuel cell stack block and at least some of the fluid carrying heat from the afterburner to exhaust the fluids to a system exhaust configured to receive the fluids from the fuel cell module and fluids from other modules inserted in the multi-module system chassis.

In various embodiments, the fuel cell module includes a module control electronics block configured to communicate within the fuel cell module, wherein the module control electronics block is configured to communicate with a heater module connected to the multi-module system chassis and the system exhaust for a heat output of the heater module to be controlled such that a heat output of the system exhaust is regulated to a predetermined setting.

In some embodiments, the fuel cell module includes an interface configured to connect the fuel cell stack block to a fuel source, the module control electronics block to the master control electronics circuitry, and the heat exhaust to the system exhaust.

In certain embodiments, the fuel cell module includes a reformer configured to produce a hydrogen-rich reformate for use by the fuel cell stack.

In yet another aspect of the present disclosure, a combined heat and power system includes a fuel cell module configured to produce an electric output and a fuel cell heat output, where the fuel cell module includes a fuel cell stack; a heater module configured to produce a heater heat output; and a multi-module system chassis including multiple module receiving locations each of which is configured to non-simultaneously receive the fuel cell module and the heater module, the multi-module system chassis also including a system exhaust configured to combine at least some of the fuel cell heat output and at least some of the heater heat output into a system heat output.

In various embodiments, the combined heat and power system includes a master control configured to communicate with the fuel cell module and the heater module and further configured to control the heater module for the heater heat output to be modified taking into account the fuel cell heat output.

In some embodiments, the combined heat and power system includes a master control configured to communicate with the fuel cell module and the heater module and further configured to control the heater module for the heater heat output to be controlled such that the system heat output including at least some of the fuel cell heat output is regulated to a predetermined setting.

In certain embodiments, the combined heat and power system includes a second fuel cell module configured to produce a second electric output and a second fuel cell heat output. Each of the multiple module receiving locations is configured to receive the second fuel cell module and the system exhaust is configured to combine at least some of the fuel cell heat output, at least some of the heater heat output, and at least some of the second fuel cell heat output into the system heat output.

In particular embodiments, the combined heat and power system includes a second heater module configured to produce a second heater heat output. Each of the multiple module receiving locations is configured to receive the second heater module and the system exhaust is configured to combine at least some of the fuel cell heat output, at least some of the heater heat output, and at least some of the second heater heat output into the system heat output.

In various embodiments, the combined heat and power system includes a master control configured to communicate with the fuel cell module, the heater module and the second heater module, and further configured to control at least one of the heater module and the second heater module for at least one of the heater heat output and the second heater heat output to be modified taking into account the fuel cell heat output.

In some embodiments, the combined heat and power system includes a master control configured to communicate with the fuel cell module, the heater module and the second heater module, and further configured to control at least one of the heater module and the second heater module for at least one of the heater heat output and the second heater heat output to be controlled such that the system heat output including at least some of the fuel cell heat output is regulated to a predetermined setting.

In certain embodiments, the combined heat and power system includes an interface configured to connect the fuel cell module and the heater module to a fuel source, and the fuel cell heat output and the heater heat output to the system exhaust.

In particular embodiments, the combined heat and power system includes a fuel cell module, and optionally a second fuel cell module, each of which includes an afterburner configured to cause consumption of remnant gases from the fuel cell stack and to output a fluid carrying heat.

In various embodiments, the combined heat and power system includes a fuel cell module, and optionally a second fuel cell module, each of which includes a reformer configured to produce hydrogen-rich reformate for use by the fuel cell stack.

In some embodiments, the combined heat and power system includes at least a first source of reformable fuel and a second source of reformable fuel, each in operable fluid communication with the fuel cell stack of the fuel cell module, a reformer or a vaporizer. At least the first source of reformable fuel can include a sensor assembly configured to determine the amount of reformable fuel remaining in the first source of reformable fuel. The combined system can include a valve assembly in operable fluid communication with at least the first source and the second source of reformable fuel and at least one of the fuel cell stack, the reformer and the vaporizer. The valve assembly can be configured, when a predetermined amount of reformable fuel remains in the first source of reformable fuel, to switch to the second source of reformable fuel and to flow the remaining fuel and/or contents of the first source of reformable fuel to the heater of the heater module to generate heat.

In certain embodiments, the combined heat and power system includes a control system for automating the operations of the valve assembly, for example, the above-described valve assembly. The control system can include a controller in communication with the sensor assembly. The controller also can be in communication with master control electronics circuitry.

In still yet another aspect of the present disclosure, methods of operating a combined heat and power fuel cell system are provided. The methods generally include flowing a reformable fuel from a first source of reformable fuel to a fuel cell stack or a reformer of a fuel cell module of a combined heat and power fuel cell system, or to a vaporizer in operable fluid communication with the fuel cell stack and/or the reformer of the fuel cell module; determining the amount of reformable fuel remaining in the first source of reformable fuel; switching to and flowing a reformable fuel from a second source of reformable fuel to at least one of the fuel cell stack, the reformer and the vaporizer when the amount of reformable fuel in the first source of reformable fuel is at or below a predetermined amount; and flowing the remaining contents of the first source of reformable fuel to a heater module of the combined heat and power fuel cell system to generate heat.

The foregoing and other features of the present disclosure are hereinafter described in greater detail with reference to the accompanying drawings.

BRIEF DESCRIPTION OF THE DRAWINGS

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

DETAILED DESCRIPTION

Figure 1:
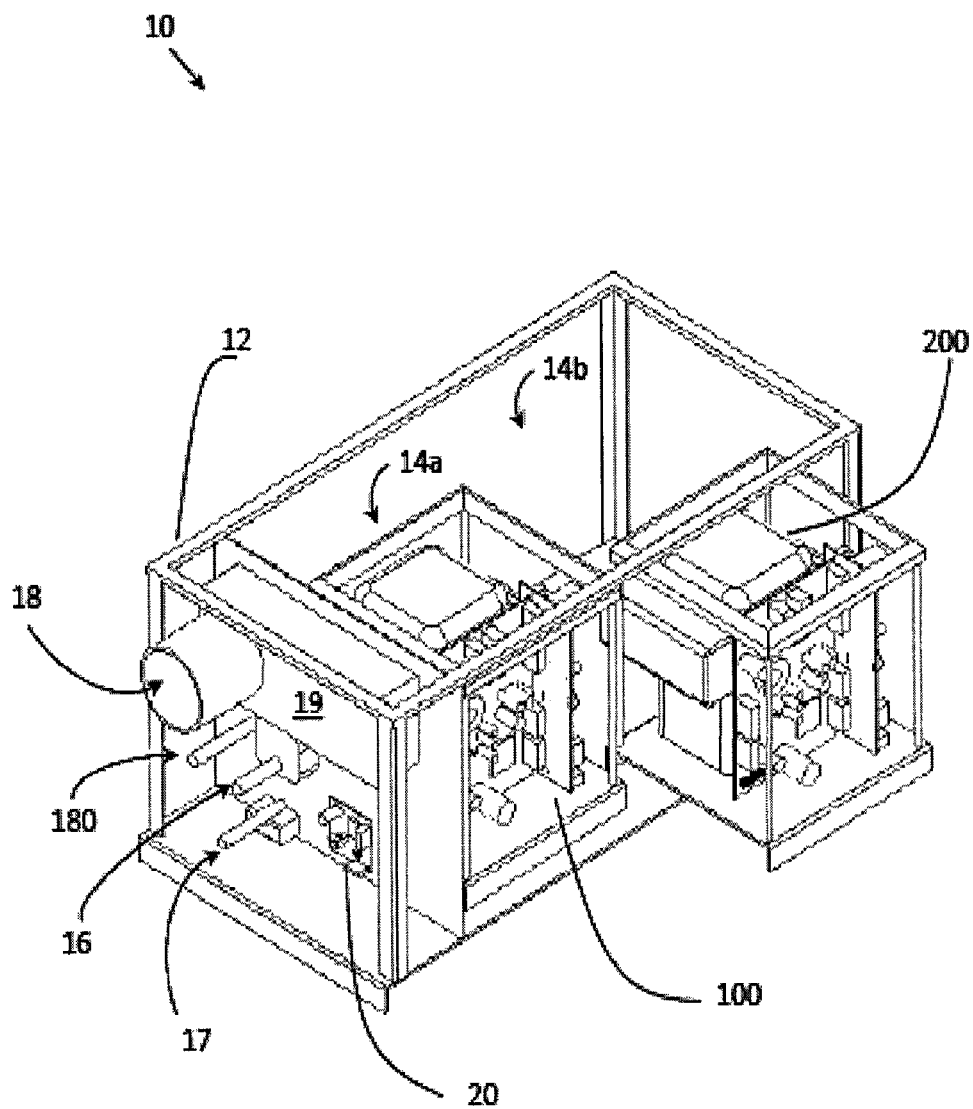
FIG. 1 illustrates a perspective view of an exemplary modular fuel cell system.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein. For example, where reference is made herein to a particular structure such as a filter element, that structure can be used in various embodiments of apparatus of the present teachings such as a closed loop filtration system and/or in methods of the present teachings, unless otherwise understood from the context.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions can be conducted simultaneously.

At various places in the present specification, values are disclosed in groups or in ranges. It is specifically intended that the description include each and every individual sub-combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," horizontal," "vertical," and the like, unless their contextual usage indicates otherwise, are to be understood herein as having no structural, functional or operational significance and as merely reflecting the arbitrarily chosen orientation of the various views of apparatus, devices, components, and/or features of the present teachings that can be illustrated in certain of the accompanying figures.

As used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly.

As used herein, to "control the flow" and "adjust the flow" of a fluid, including grammatical equivalents and equivalent expressions and language, can be to increase the flow of fluid, to decrease the flow of fluid, to maintain a substantially constant flow of fluid, and/or to interrupt or cease the flow of fluid. Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust the pressure."

As used herein, a "valve assembly" refers to a structure that can control fluid communication and fluid flow characteristics between or among components and/or structure, for example, the flow of a mixture of hydrocarbons from a reservoir through a filter element and back to the reservoir. A valve assembly can be a pressure metering assembly. A valve assembly can include a proportional valve; a series of proportional valves; an on/off valve such as a solenoid valve; a series of on/off valves, for example, a series of on/off solenoid valves; a three-way valve; a series of three-way valves; a check valve; a series of check valves; an orifice; a series of orifices; and combinations thereof, which can be in series. Where the components are indicated as being in series, the components can be either in a parallel series or in a sequential series.

As used herein, a "sensor assembly" refers to any suitable sensor or sensing device or combination of sensor or sensing devices for the operating parameters being monitored, measured and/or determined. For example, fuel flow rates can be monitored with any suitable flow meter, pressures can be monitored with any suitable pressure-sensing or pressure-regulating device, temperatures can be monitored with any suitable thermocouple, and the like. Accordingly, examples of sensor devices include flow meters, pressure meters, thermocouples, thermistors, and resistance temperature detectors. A sensor or sensing device can include a balance, a weighing scale such as a spring scale, or other device for measuring, determining and/or monitoring the weight of an object, for example, a source of reformable fuel. The sensor assemblies optionally can include a transducer in communication with the controller.

Figure 5A:
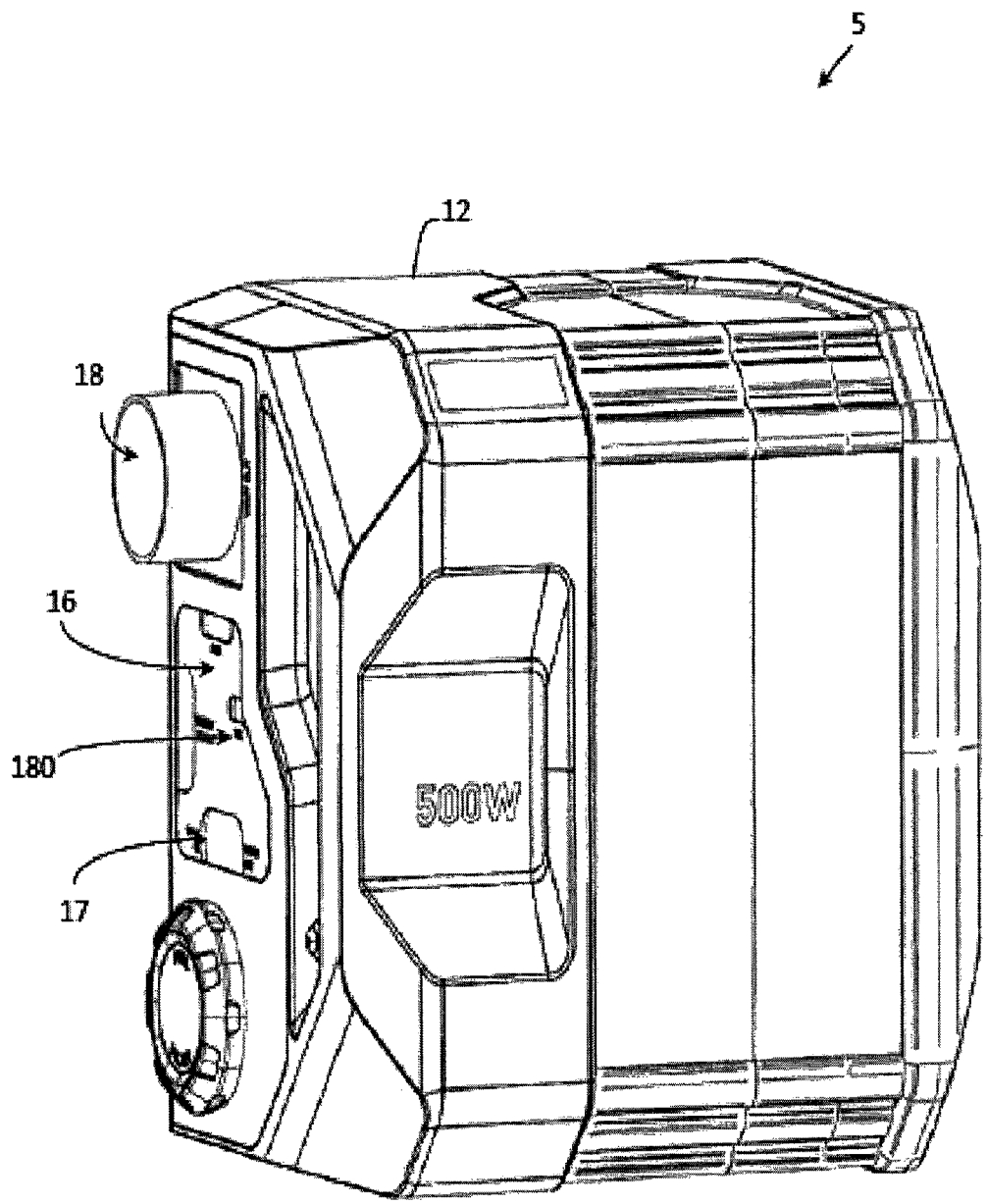
FIG. 5A illustrates an exemplary fuel cell modular system that accommodates up to one module.
Figure 5B:
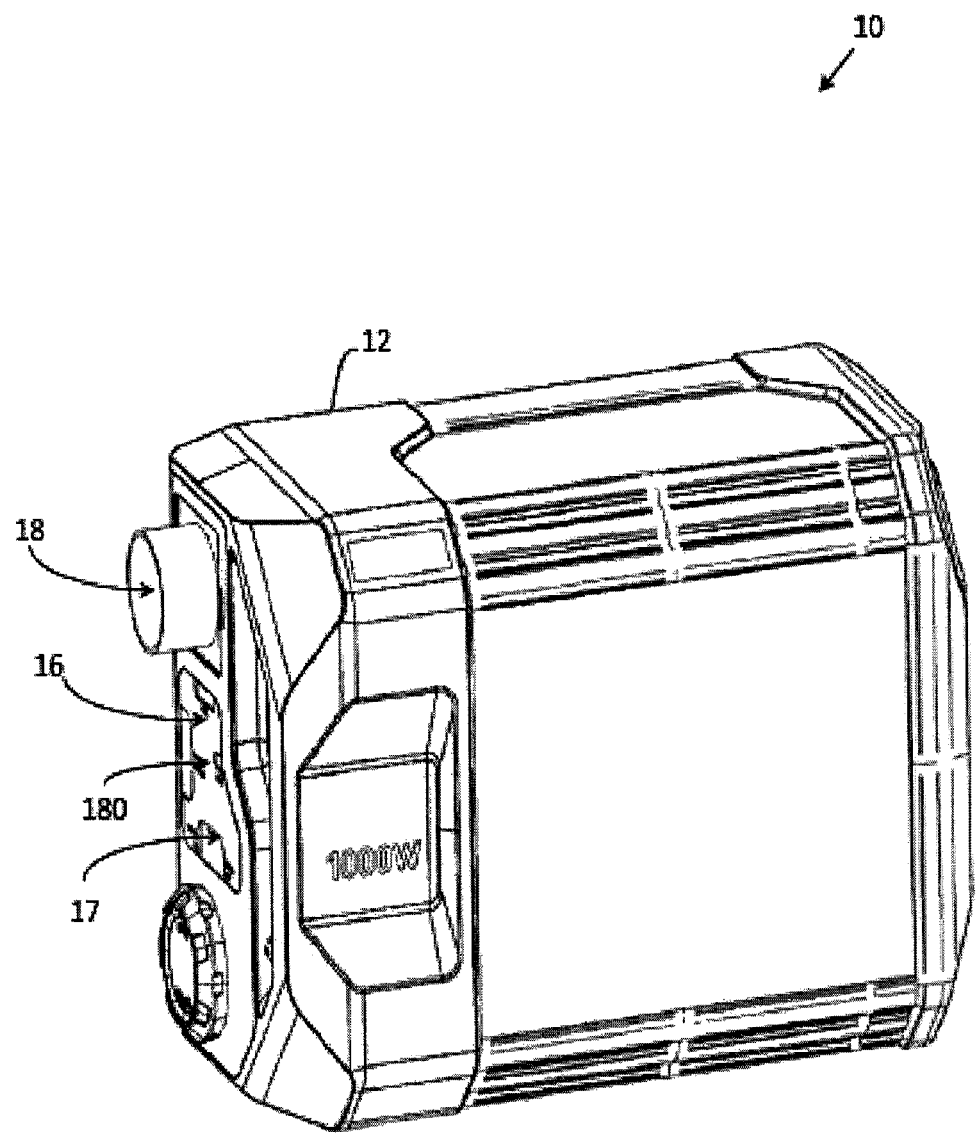
FIG. 5B illustrates an exemplary fuel cell modular system that accommodates up to two modules.
Figure 5C:
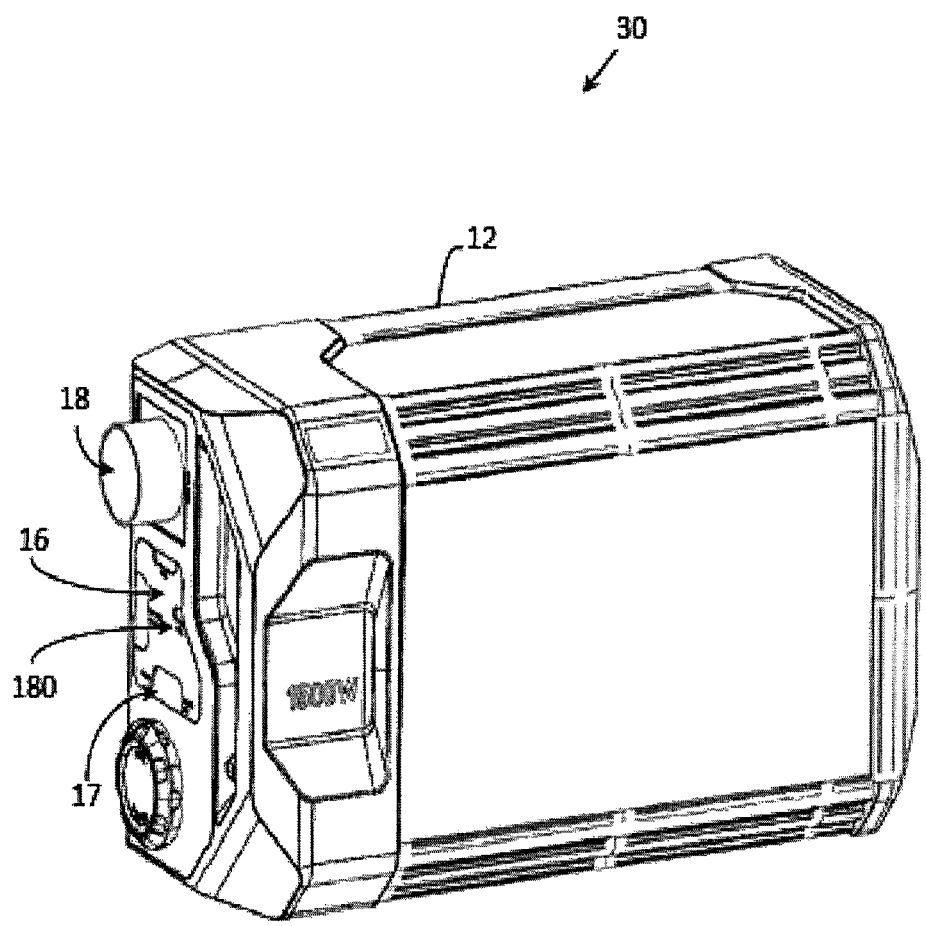
FIG. 5C illustrates an exemplary fuel cell modular system that accommodates up to three modules.
Figure 5D:
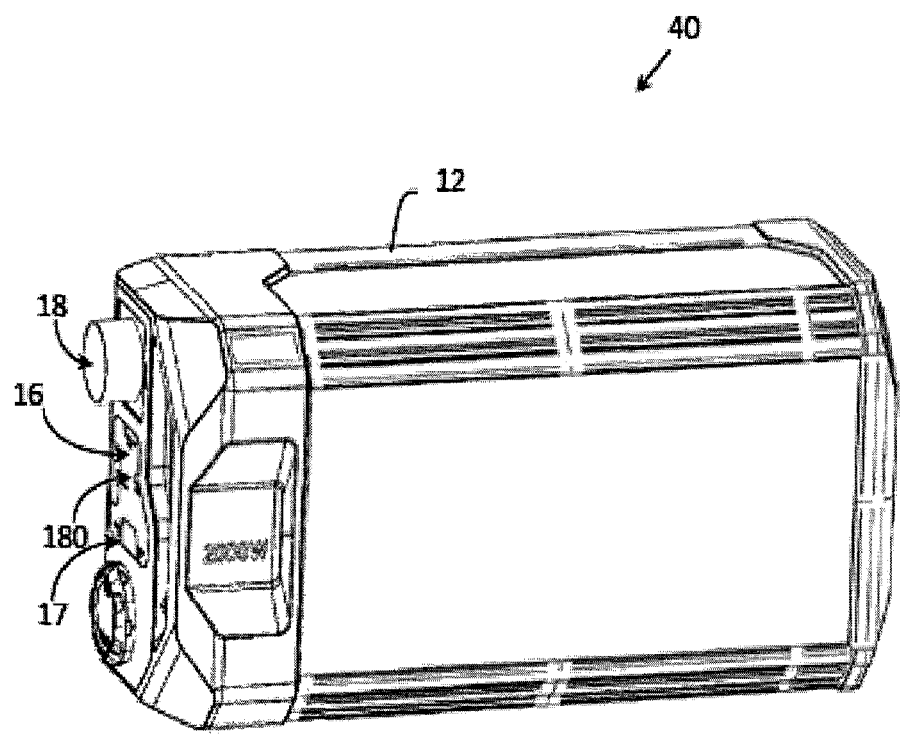
FIG. 5D illustrates an exemplary fuel cell modular system that accommodates up to four modules in series.
Figure 5E:
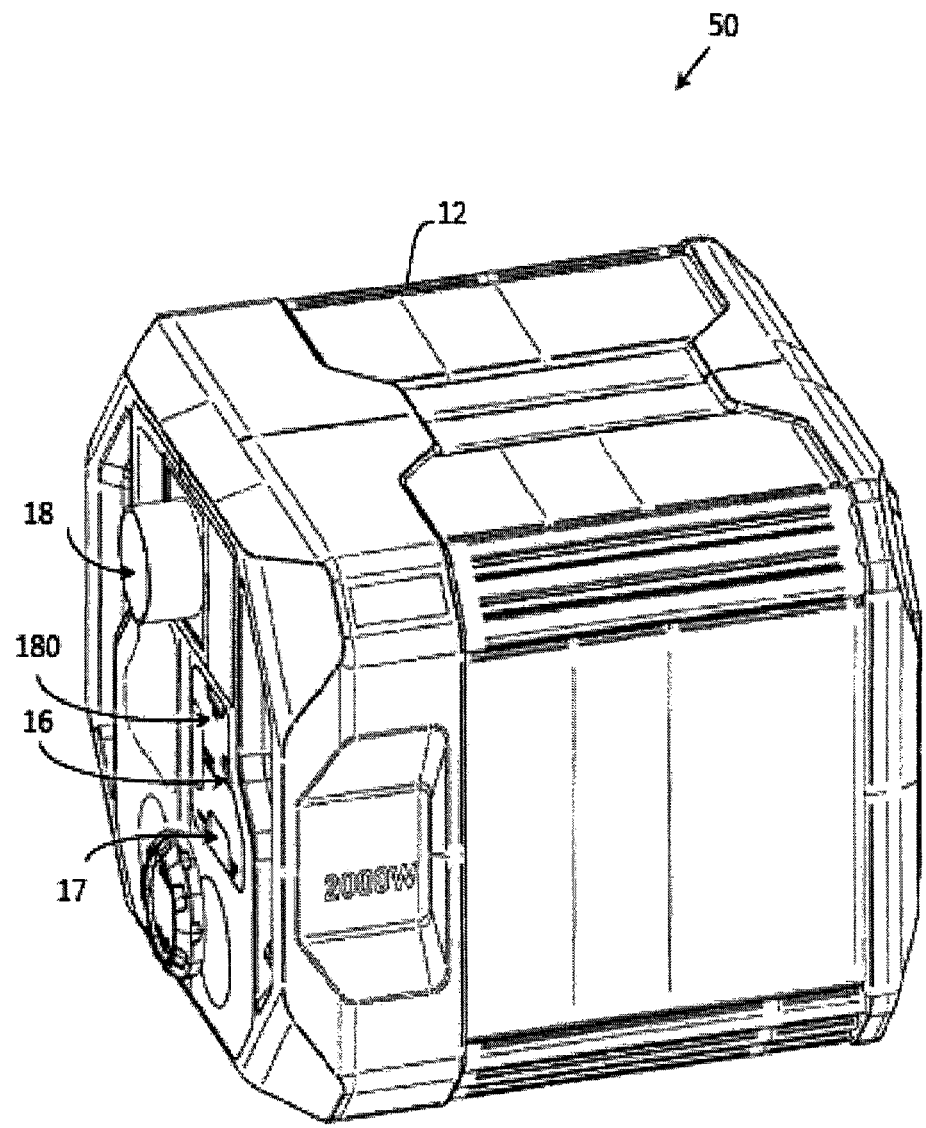
FIG. 5E illustrates an exemplary fuel cell modular system that accommodates up to four modules with two groups of series modules disposed back to back.

FIG. 1 illustrates an exemplary modular fuel cell system 10 that includes a chassis 12. The chassis 12 is a multi-module system chassis that includes multiple module receiving locations 14a and 14b. Although in the illustrated embodiment, the chassis 12 is shown including two module receiving locations 14, as described below, the chassis 12 can include more than two module receiving locations 14. The system 10 is shown in FIG. 1 with portions of the enclosure removed for ease of illustration. The system 10 is shown fully enclosed in FIG. 5B.

In the illustrated embodiment, the system 10 includes a fuel cell module 100 and a heater module 200. The fuel cell module 100 and heater module 200 are described in more detail below. Generally, though, the fuel cell module 100 is a device in which an electrochemical reaction takes place between fuel, such as a gas containing hydrogen, for example, a hydrogen-rich reformate, and an oxidizer gas, such as gas containing oxygen, for example, air, to extract an electrical output. The electrochemical reaction in the fuel cell module 100 also can produce a heat output. In general, the heater module 200 is a device that produces a heat output.

The illustrated embodiment shows the fuel cell module 100 installed or connected to the chassis 12 while, for purposes of illustration, the heater module 200 is shown removed from or about to be installed or connected to the chassis 12. Although in the illustrated embodiment one fuel cell or power module 100 and one heater module 200 are shown, the module receiving locations 14a and 14b are each configured to receive non-simultaneously fuel cell modules 100 and heater modules 200. As such, each of the module receiving locations 14a or 14b can receive a fuel cell module 100 and each of the module receiving locations can also receive a heater module 200. Thus, a chassis such as chassis 12 that has two module receiving locations can receive up to two fuel cell modules 100, up to two heater modules 200, or up to one fuel cell module 100 and one heater module 200.

The system 10 receives fuel via a fuel transport 16 that receives the fuel from a source of reformable fuel and transports the fuel to the modules 100 and 200.

The system 10 also includes a system electrical output 17 that combines and outputs the electrical outputs of the fuel cell modules installed in the chassis 12. In the illustrated embodiment, the system electrical output 17 outputs the electrical output of the lone fuel cell module 100. In embodiments where the system 10 includes more than one fuel cell module 100, the system 10 can combine the electrical output of all the fuel cell modules 100 via, for example, bus bars connected to the electrical output 17.

The system 10 also includes a system exhaust 18 that can combine and exhaust at least some of the heat output of the modules installed in the chassis 12. In the illustrated embodiment, the system exhaust 18 exhausts heat from the fuel cell module 100 and the heater module 200. In the illustrated embodiment, the system 10 includes a heat exchanger/circulation pump 19. The heat exchanger transfers heat from fluid exhausted from the modules 100 and 200 to fluid to be exhausted by the system exhaust 18. The circulation pump circulates liquid that is heated by the heat removed from the fluid exhausted from the modules 100 and 200. The heated liquid can exit the system 10 via the circulation output 180. In some embodiments, the system 10 does not include one or more of a heat exchanger, a circulation output, and a circulation pump.

In the illustrated embodiment, the system 10 further includes a master electronics circuitry 20 that can include a user interface, safety shut-off controls, a remote communication hub, and other measurement and control functions. The master electronics circuitry 20 can communicate with the modules 100 and 200. In various embodiments, as discussed below, the system 10 does not include a master electronics circuitry.

Figure 2A:
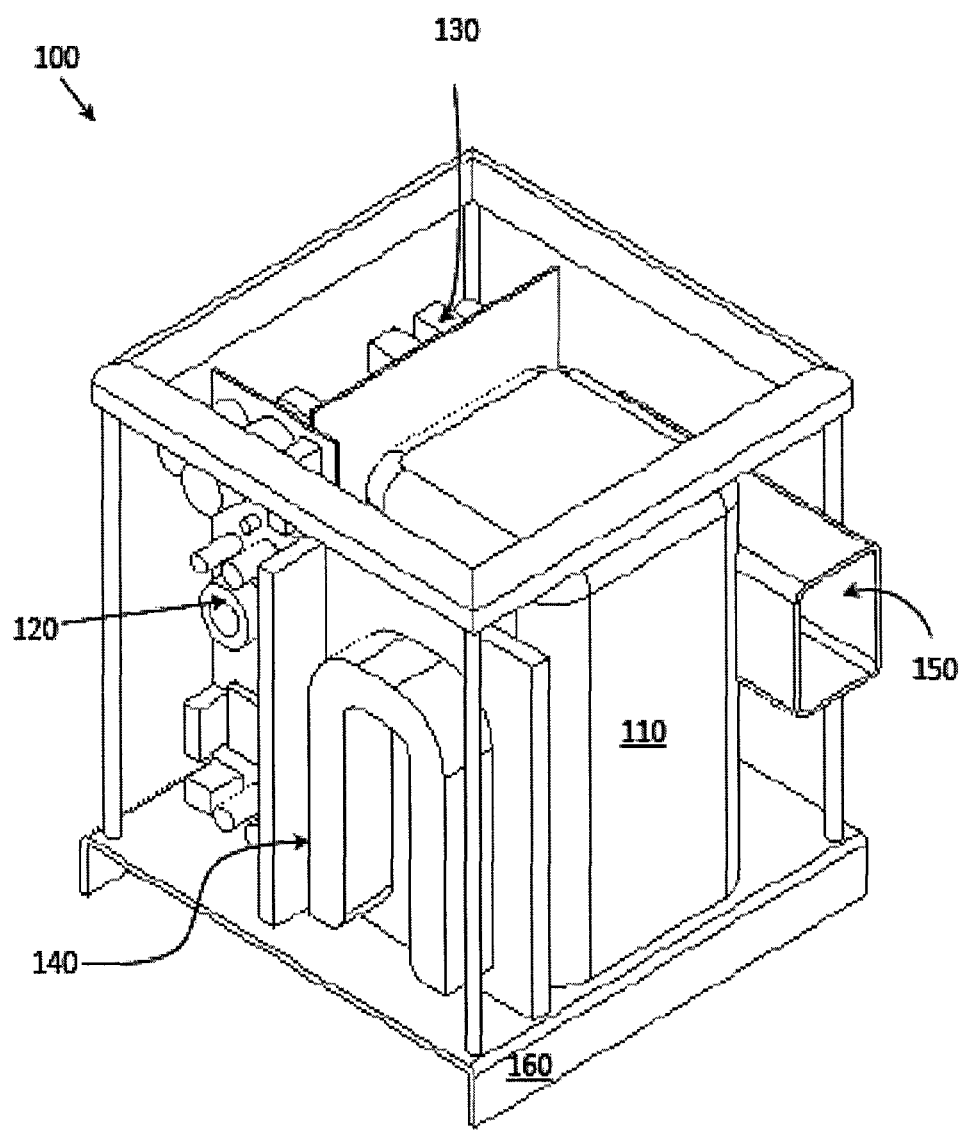
FIGS. 2A and 2B illustrate perspective and side views of an exemplary fuel cell module.
Figure 2B:
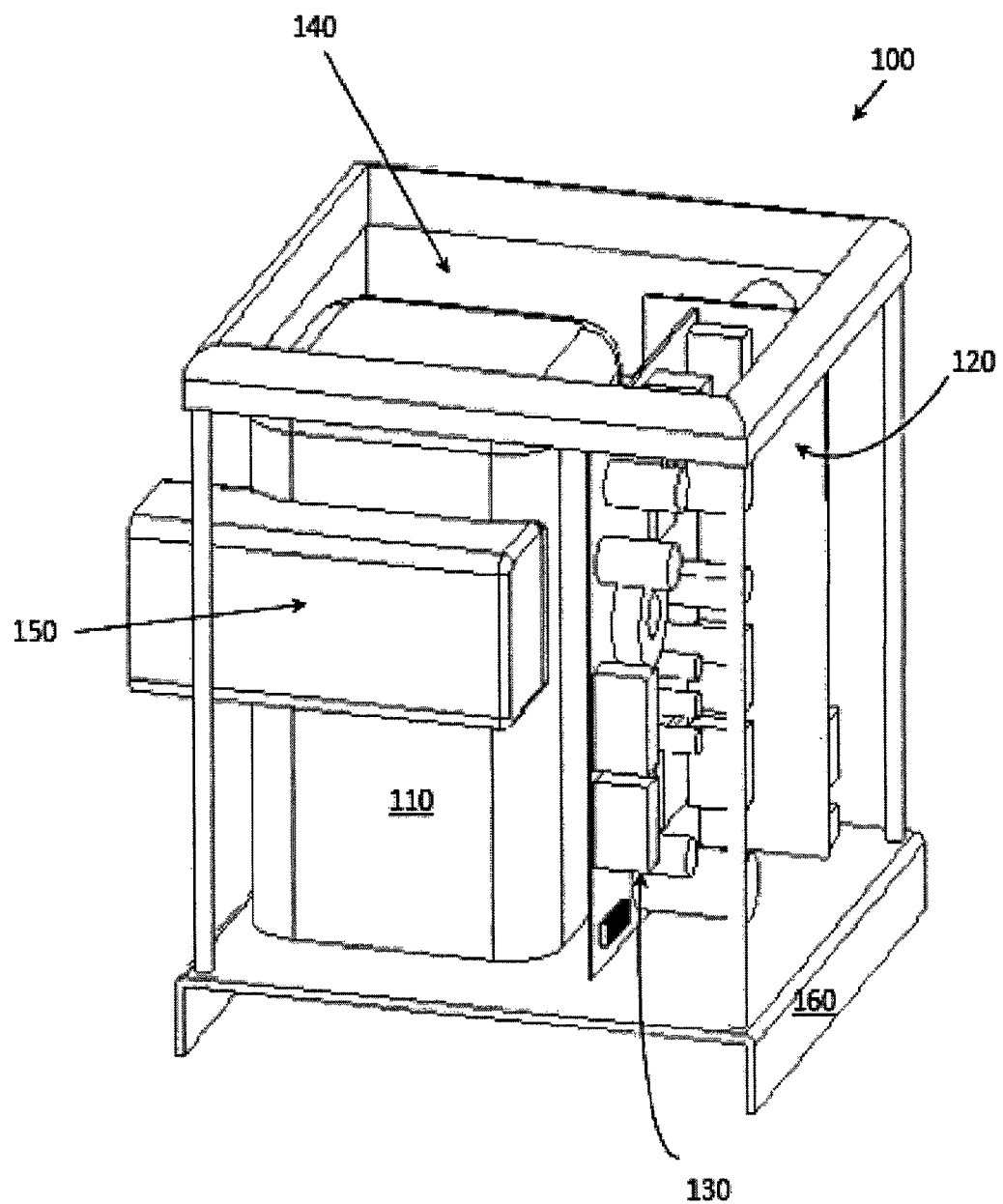

FIGS. 2A and 2B illustrate perspective and side views of an exemplary fuel cell module 100. In general, the fuel cell module 100 includes in a single modular entity all or most of the power and controls systems needed to support its rated output. In that sense, the module 100 is by itself a fully operational fuel cell system. However, in general, the module does not include components outside of systems needed to support its rated output and any systems needed to interact within the system. Thus, the module generally does not include components that are better provided at the system level to avoid unnecessary redundancy between or among modules.

Specifically, the module 100 includes a fuel cell stack 110 in which the electrochemical reaction discussed above takes place to produce the electrical output. As a result of the electrochemical reaction, the fuel cell stack also produces heat output. The ratio of electrical to heat output is a function of the efficiency of a fuel cell stack. For example, in a fuel cell stack that is 50% efficient, approximately half of the energy derived from the fuel is converted to the electrical output while the other half is converted to heat.

Examples of fuel that the fuel cell stack can use include hydrogen, which can be in the form of hydrogen gas. However, alternative fuels such as propane, natural gas, diesel, gasoline, jet fuel, and biofuels can be used. The use of alternative fuels usually requires that the fuel be reformed prior to use. Reforming is the process of creating and/or separating hydrogen gas from the fuel. In various embodiments, the fuel cell module includes a reformer to reform the fuel. In some embodiments, the reformer is included in the system, but external to the module. For example, the reformer can take the form of a module, similar to the modules 100 and 200, that can be insertable in the chassis 12. In particular embodiments, the reformer is included in the system external to the module, but not as a module. In certain embodiments, the reformer is provided external to the system.

Continuing to reference the figures, the module 100 also includes power electronics circuitry 120 that converts the electrical output of the fuel cell stack 110 to a regulated output of the fuel cell module 100. The module 100 further includes module control electronics circuitry 130 that can communicate with the master electronics circuitry 20 of the system 10. The module control electronics circuitry 130 also communicates within the fuel cell module 100 to, for example, set maximum power output limits, and the like.

In the illustrated embodiment, the module 100 further includes a balance of plant 140. The balance of plant can include valves, blowers, fans and/or other devices that are complementary to the fuel cell stack and that allow or assist the fuel cell stack or other components of the module to perform to their rating. For example, the balance of plant can include a device (e.g., a fan, a blower such as a centrifugal blower, a series of blowers such as a series of centrifugal blowers, an air pump, combinations thereof, and the like) that exhaust a fluid (e.g., air, water vapor, combinations thereof, and the like) carrying heat (i.e., the heat output) from a fuel cell stack. An example of the design and use of centrifugal blowers and a blower system are disclosed in U.S. Patent Application Publication No. 2012/0328969, by DeWald et al.

The module 100 also includes a heat exhaust 150 that receives at least some of the fluid carrying the heat removed from the fuel cell stack 110 and exhausts the fluid to the system exhaust 18. As discussed above, the system exhaust 18 receives the fluid carrying heat from the module 100 and fluid carrying heat from other modules in the multi-module system chassis 12.

In certain embodiments, a fuel cell module can include an afterburner that can cause consumption (e.g., combustion, oxidation, and the like) of remnant fluid (e.g., hydrogen) from the fuel cell stack and outputs a fluid (e.g., water vapor) carrying heat. In such embodiments, the heat exhaust can receive the combination of at least some of the fluid carrying heat from the fuel cell stack and at least some of the fluid carrying heat from the afterburner. The system exhaust can receive this combination of fluids from the fuel cell module and fluid from other modules in the multi-module system.

In some embodiments, the heat output of the fuel cell module can be increased by diverging some of the fuel input into the fuel cell module to the afterburner to increase the heat output of the afterburner. In certain embodiments, the fuel cell stack and the afterburner reside within one common enclosure.

The module 100 also includes a structure 160. The structure 160 directly or indirectly connects components of the fuel cell module 100 so that together these components form the fuel cell module 100. For example, in the illustrated embodiment, the structure 160 connects the fuel cell stack 110, the power electronics circuitry 120, the module control electronics circuitry 130, the balance of plant 140, and the heat exhaust 150. In some embodiments, the structure connects fewer components than those illustrated, while in various embodiments the structure connects more components than those illustrated, for example, including an afterburner and/or a reformer, each in operable fluid communication with the fuel cell stack. Connection provided by the structure makes the fuel cell module a unitary fuel cell module that is held together and insertable in the system chassis as a unit.

The fuel cell module 100 interfaces with the system 10 to receive fuel via the fuel transport 16, to communicate via the module control electronics circuitry 130 to the master electronics circuitry 20, to exhaust heat via the heat exhaust 150 to the system exhaust 18, and so on.

Figure 3A:
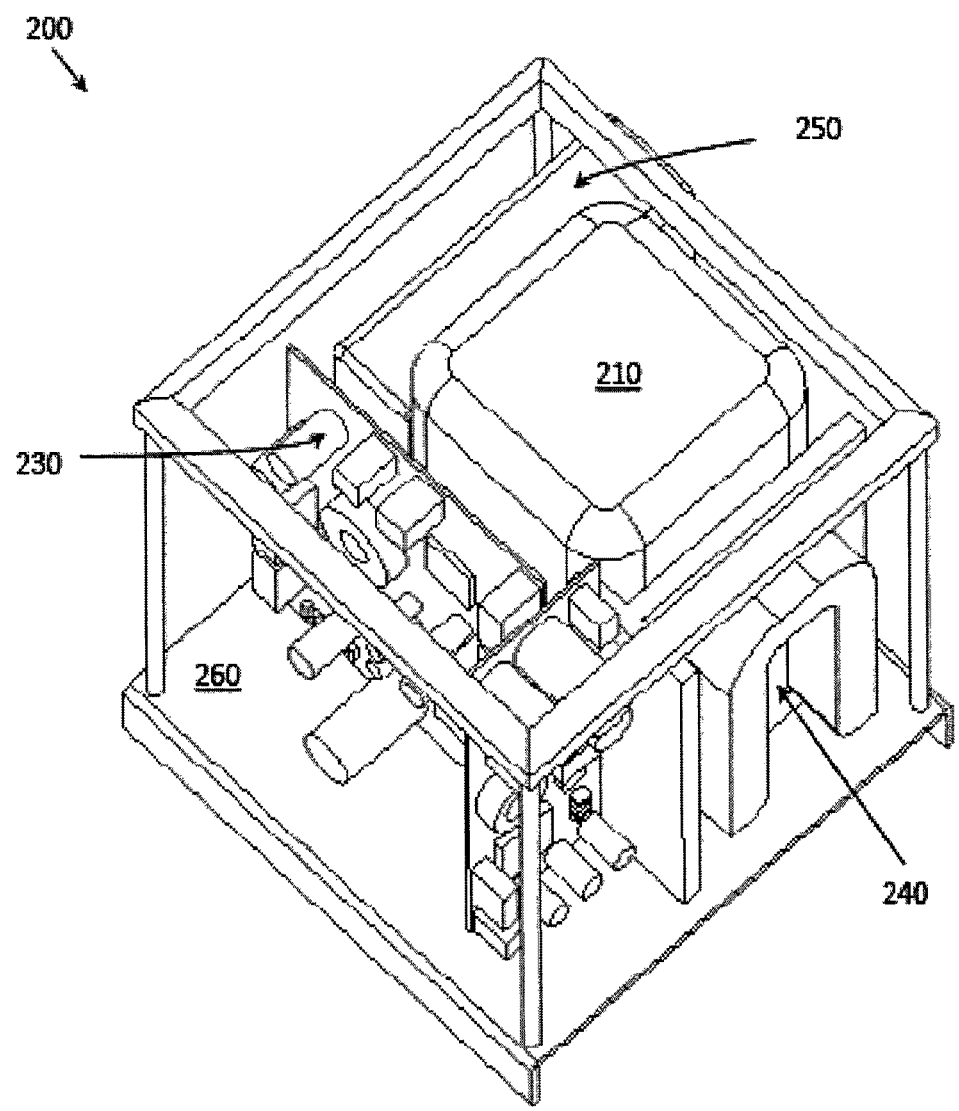
FIGS. 3A and 3B illustrate perspective and side views of an exemplary heater module.
Figure 3B:
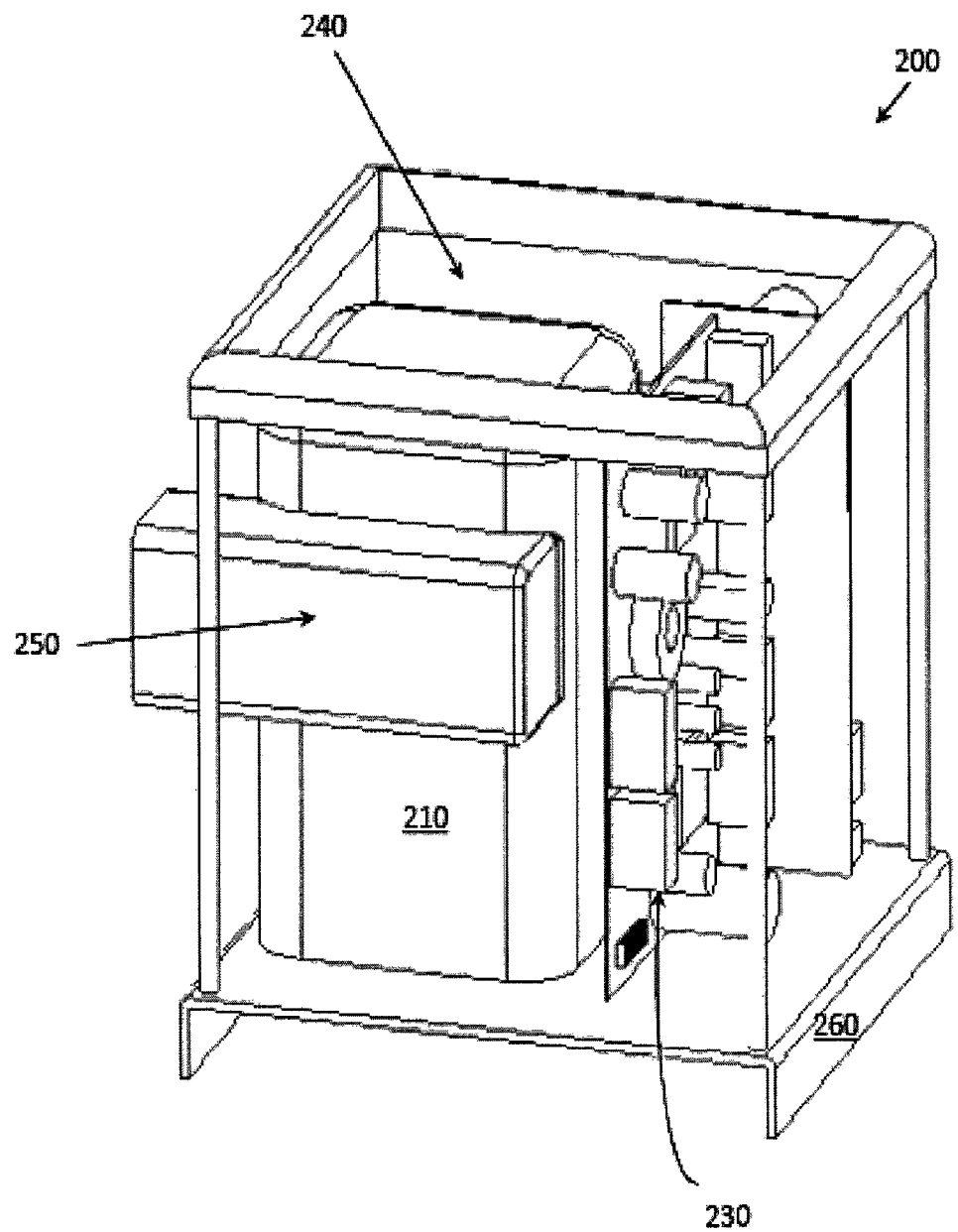

FIGS. 3A and 3B illustrate perspective and side views of an exemplary heater module 200. In general, the heater module includes in a single modular entity all or most of the power and controls systems to support its rated output. In that sense, the module is by itself a fully operational heating system. However, in general, the module does not include components outside of systems needed to support its rated output and any systems needed to interact within the system. Thus, similar to the fuel cell module, the heater module generally does not include components that are better provided by the system to avoid unnecessary redundancy.

Specifically, the heater module 200 includes a heater 210 that produces a heat output. For example, the heater can produce a heat output by combustion, oxidation, interaction of fuel with an electric element, or by any other heat-producing method or exothermic reaction. The module 200 also includes module control electronics circuitry 230 that can communicate with the master electronics circuitry 20 of the system 10 or with module control electronics circuitry 130 or 230 of other modules in the system 10. The module control electronics circuitry 230 also communicates within the heater module 200 to, for example, set maximum heat output limits, and the like.

In the illustrated embodiment, the module 200 further includes a balance of plant 240. The balance of plant can include valves, blowers, fans and/or other devices that are complementary to the heater and that allow or assist the heater and other components of the module to perform to their rating. For example, the balance of plant can include a device (e.g., a fan, a blower such as a centrifugal blower, a series of blowers such as a series of centrifugal blowers, an air pump, combinations thereof, and the like) that exhaust a fluid (e.g., air, water vapor, and the like) carrying heat from a heater.

The module 200 also includes a heat exhaust 250 that receives at least some of the fluid carrying the heat from the heater 210 and exhausts the fluid to the system exhaust 18. As discussed above, the system exhaust 18 receives the fluid carrying heat from the heater module 200 and fluid carrying heat from other modules in the multi-module system chassis 12.

The module 200 also includes a structure 260. The structure 260 directly or indirectly connects components of the heater module 200 so that together these components form the heater module 200. For example, in the illustrated embodiment, the structure 260 connects the heater 210, the module control electronics circuitry 230, the balance of plant 240 and the exhaust 250. In some embodiments, the structure connects fewer components than those illustrated, while in other embodiments the structure connects more components than those illustrated. Connection provided by the structure makes the heater module a unitary heater module that is held together and insertable in the system chassis as a unit.

The heater module 200 interfaces with the system 10 to receive fuel via the fuel transport 16, to communicate via the module control electronics circuitry 230 to the master electronics circuitry 20, to exhaust heat via the heat exhaust 250 to the system exhaust 18, and so on.

The fuel cell module 100 and the heater module 200 have dimensions that allow for the modules to be insertable as a unit into the system chassis 12. Therefore, in the fuel cell module 100, for example, dimensions of the fuel cell stack 110, the power electronics circuitry 120, the module control electronics circuitry 130, and the balance of plant 140 each conform to an envelope for the unitary fuel cell module 100 to be insertable as a unit into the multi-module system chassis 12. Similarly, in the heater module 200, dimensions of the heater 210, the module control electronics circuitry 230, and the balance of plant 240 can each conform to an envelope for the unitary heater module 200 to be insertable as a unit into the multi-module system chassis 12.

In various embodiments, a fuel cell module and a heater module can be conceptualized as a series of functional blocks that are arranged stacked as a unit. Therefore, in the fuel cell module 100, for example, the functional blocks include the fuel cell stack 110 (i.e., a fuel cell stack block), the power electronics circuitry 120 (i.e., a power electronics block), and the like. The structure 160 connects the blocks together for the fuel cell module 100 to be insertable into the multi-module system chassis 12 as a unit.

Figure 4:
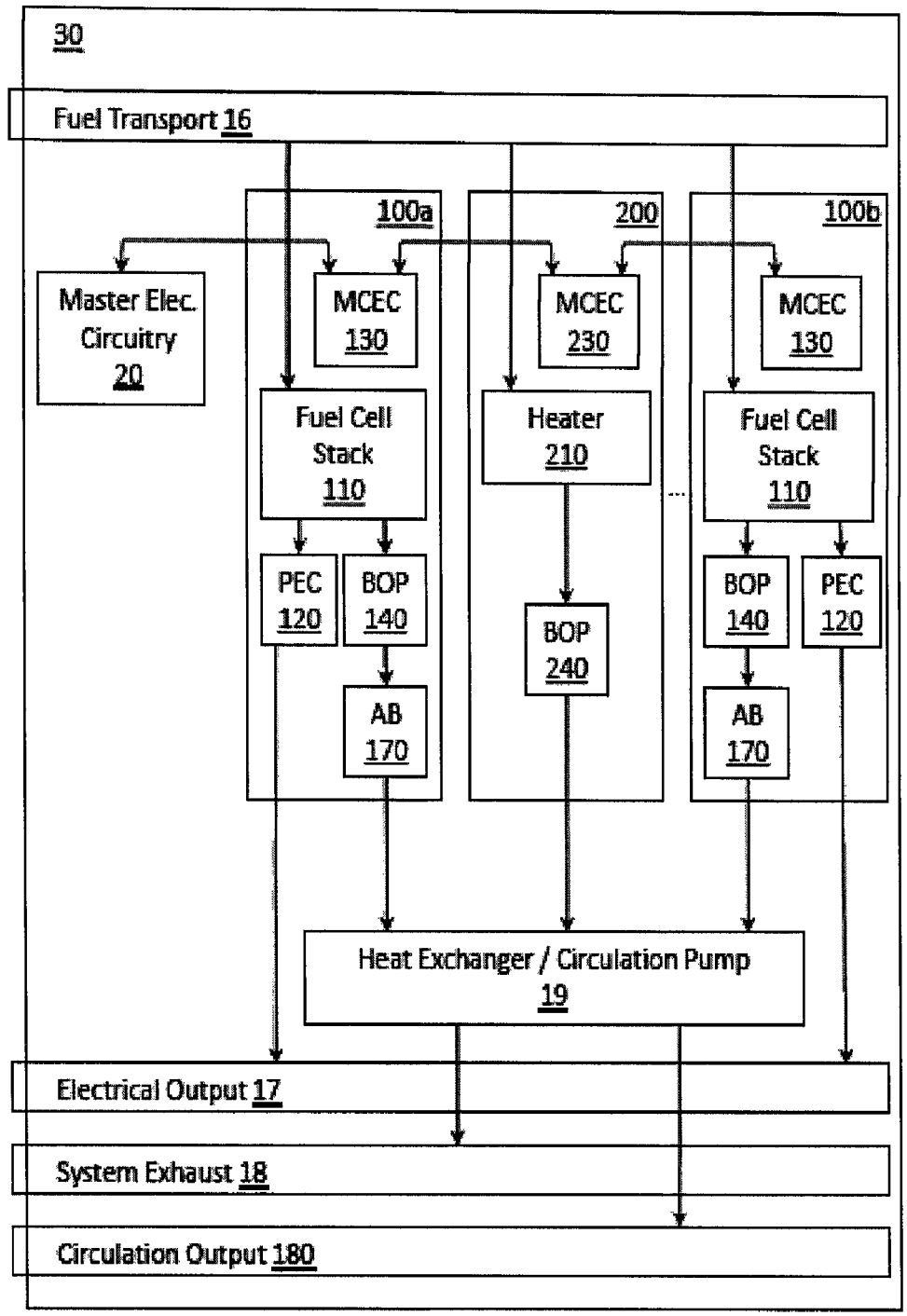
FIG. 4 illustrates a block diagram of an exemplary modular fuel cell system.

FIG. 4 illustrates a block diagram of an exemplary modular fuel cell system 30. As discussed above, a modular fuel cell system such as system 30 can include fuel cell modules 100. In the illustrated embodiment, the system 30 includes two fuel cell modules 100a and 100b. The system 30 can also include heater modules 200. In the illustrated embodiment, the system 30 includes one heater module 200.

The system 30 receives fuel via a fuel transport 16 that receives the fuel from a fuel source and transports the fuel to the modules 100 and 200. The system 30 also includes a system electrical output 17 (e.g., electrical bus) that combines and outputs the electrical outputs of the fuel cell modules 100. The system electrical output 17 can connect to devices powered or charged by the electrical output 17 including a battery.

The system 30 further includes a system exhaust 18 that combines and exhausts at least some of the heat output of the fuel cell modules 100 and the heater modules 200. The system 30 also includes a circulation output 180 that transports liquid heated by heat from the fuel cell modules 100 and the heater modules 200.

The system 30 further includes a master electronics circuitry 20 that can include a user interface, safety shut-off controls, a remote communication hub and other measurement and control functional blocks. The master electronics circuitry 20 communicates with the modules 100 and 200.

The fuel cell modules 100a and 100b include the fuel cell stacks 110 that produce an electrical output and a heat output. The modules 100 also include power electronics circuitry 120 that converts the electrical output of the fuel cell stack 110 into the regulated output of the fuel cell modules 100. The modules 100 further include module control electronics circuitry 130 that communicates with the master electronics circuitry 20 of the system 30. The module control electronics circuitry 130 also communicates within the fuel cell module 100 to, for example, set maximum power output limits, and the like.

The fuel cell module 100 further includes the balance of plant 140 that includes, for example, a device (e.g., a fan, a blower such as a centrifugal blower, a series of blowers such as a series of centrifugal blowers, an air pump, combinations thereof, and the like) that exhausts fluid (e.g., air) carrying heat from the fuel cell stack 110 for at least some of the heat output to be transferred by the heat exchanger/circulation pump 19 to fluid to be exhausted to the system exhaust 18.

In the illustrated embodiment, the modules 100 include afterburners 170 that can cause consumption (e.g., combustion, oxidation, and the like) of remnant fluid (e.g., hydrogen) from the fuel cell stack 110 and output a fluid (e.g., water vapor) carrying heat. The heat exchanger/circulation pump 19 exchanges the combination of at least some of the fluid carrying heat from the fuel cell stack 110 and at least some of the fluid carrying heat from the afterburner 170 to fluid that is transferred to the system exhaust 18. The circulation pump causes transfer of some of the heat from the fuel cell stack 110 and at least some of the fluid carrying heat from the afterburner 170 to liquid that is circulated via the circulation output 180.

The heater module 200 includes a heater 210 that produces a heat output as described above. The module 200 also includes module control electronics circuitry 230 that communicates with the master electronics circuitry 20 of the system 30 or with module control electronics circuitry 130 or 230 of other modules in the system 30. The module control electronics circuitry 230 also communicates within the heater module 200 to, for example, set maximum heat output limits, and the like.

The heater module 200 further includes the balance of plant 240 that includes, for example, a device (e.g., a fan, a blower such as a centrifugal blower, a series of blowers such as a series of centrifugal blowers, an air pump, combinations thereof, and the like) that exhausts a fluid (e.g., air) carrying heat from the heater 210. The module 200 exhausts the fluid carrying the heat from the heater 210 to be transferred by the heat exchanger/circulation pump 19 to fluid to be exhausted to the system exhaust 18 or liquid to be circulated via the circulation output 180.

The fuel cell modules 100 and the heater module 200 interface with the system 30 at least to receive fuel via the fuel transport 16, to communicate via the module control electronics circuitry 130 and 230, respectively, to the master electronics circuitry 20 and to exhaust heat via the heat exhausts 150 and 250, respectively, to the system exhaust 18. In addition, the fuel cell modules 100 interface with the system 30 to deliver their electrical output via the system electrical output 17.

The module control electronics circuitry 130 and 230 and the master electronics circuitry 20 can be daisy chained for communication. This means that the master electronics circuitry 20 connects to the first module 100a, which in turn connects to the second module 200, and the second module 200 to the third module 100b. In one embodiment, the module control electronics circuitry 130 and 230 communicate via a CAN (controller area network) bus. Alternatively, the module control electronics circuitry 130 and 230 can communicate with the master electronics circuitry 20 in a discreet fashion, for example, each module control electronics circuitry 130 and 230 communicates individually with the master electronics circuitry 20.

In certain embodiments where at least one fuel cell module and at least one heater module are installed, the master electronics circuitry can communicate with the module electronics circuitry of the fuel cell module and the heater module. The master electronics circuitry can control the heat output of the heater module, for example, by taking into account the heat output of the fuel cell.

For example, a system 10 including a single 500 W fuel cell module 100 and a single 2,500 BTU/hr heater module 200 can be installed in an application where 500 W of electrical power and 2,000 BTU/hr of heat are required. The fuel cell module 100 alone can provide the 500 W of electrical output and can be able to provide approximately 1,600 BTU/hr heat output while delivering the 500 W of electrical output. To make up for the difference in heat output (i.e., 2,000 BTU/hr−1,600 BTU/hr=400 BTU/hr) the master electronics circuitry 20 can communicate with the module electronics circuitry 230 of the heater module 200 to command a heater output of 400 BTU/hr.

Thus, in particular embodiments, the master electronics circuitry communicates with the heater module. The heat output of the heater module can be controlled such that the heat output of the system, including at least some heat from the fuel cell module and some heat from the heater module, is regulated to a predetermined setting. Consequently, the system including the fuel cell module and the heater module can be operated as a combined heat and power (CHP) system that breaks the dependence of the heat output from the electrical output. The fuel cell module and the heater module can be operated to produce heat output only at a predetermined setting, electrical power with no additional heat output, or electrical output with additional heat output at a predetermined setting.

In various embodiments, the system does not include a master electronics circuitry and instead uses a master module/slave module arrangement. In such embodiments, one of the modules acts as the master and the remaining modules act as the slaves. The module electronics circuitry of the master module can act similar to the master control electronics. The remaining modules can be connected to (e.g., daisy chained together) and controlled by the master module.

In some embodiments where at least one fuel cell module and at least one heater module are installed, the module electronics circuitry of the master module acting as the master control electronics can communicate within its corresponding module and with the module electronics circuitry of other fuel cell modules or other heater modules. The module electronics circuitry of the master module acting as the master control electronics can control the heat output of the heater module taking into account the heat output of the fuel cell. This way, the heat output at the system exhaust is regulated to a predetermined setting as discussed above.

In the embodiments shown in FIGS. 1 and 4, the fuel cell modules 100 can be 500 W modules and the heater modules 200 can be 10,000 BTU/hr modules. However, different sized fuel cell modules 100 (e.g., 100 W, 500 W, 1000 W, and the like) and different sized heater modules 200 (e.g., 2,500 BTU/hr, 5,000 BTU/hr, 10,000 BTU/hr, and the like) can be used, including, for example combinations of different fuel cell modules 100 and different heater modules 200 within the same system.

FIGS. 5A-5E illustrate exemplary fuel cell modular systems 5, 10, 30, 40 and 50, respectively. The embodiments of FIGS. 5A-5E seek to illustrate exemplary sizes for modular fuel cell systems. In the illustrated embodiments, the systems 5, 10, 30, 40 and 50 are illustrated fully enclosed. The main differences between systems are the physical size of the chassis 12 and the number of module receiving locations. Otherwise, the systems are almost identical. The modularity of these systems creates a very flexible fuel cell system platform.

The system 5 accommodates a single module and thus when equipped with a 500 W fuel cell module 100, for example, the system 5 results in a 500 W fuel cell system or when equipped with a 5,000 BTU/hr heater module 200, for example, the system 5 results in a 5,000 BTU/hr heater system.

The system 10 accommodates two modules and thus when equipped with two 500 W fuel cell modules 100, for example, the system 10 results in a 1000 W fuel cell system. When equipped with two 5,000 BTU/hr heater modules 200, for example, the system 10 results in a 10,000 BTU/hr heater system. When equipped with one 500 W fuel cell module 100 and one 5,000 BTU/hr heater module 200, for example, the system 10 results in a combination 500 W electrical output and 5,000 BTU/hr heat output system.

Similarly, the system 30 accommodates three modules. The systems 40 and 50 both accommodate four modules each. The system 40 accommodates four modules disposed in series, while the system 50 accommodates four modules with two groups of two modules disposed back to back.

Figure 6:
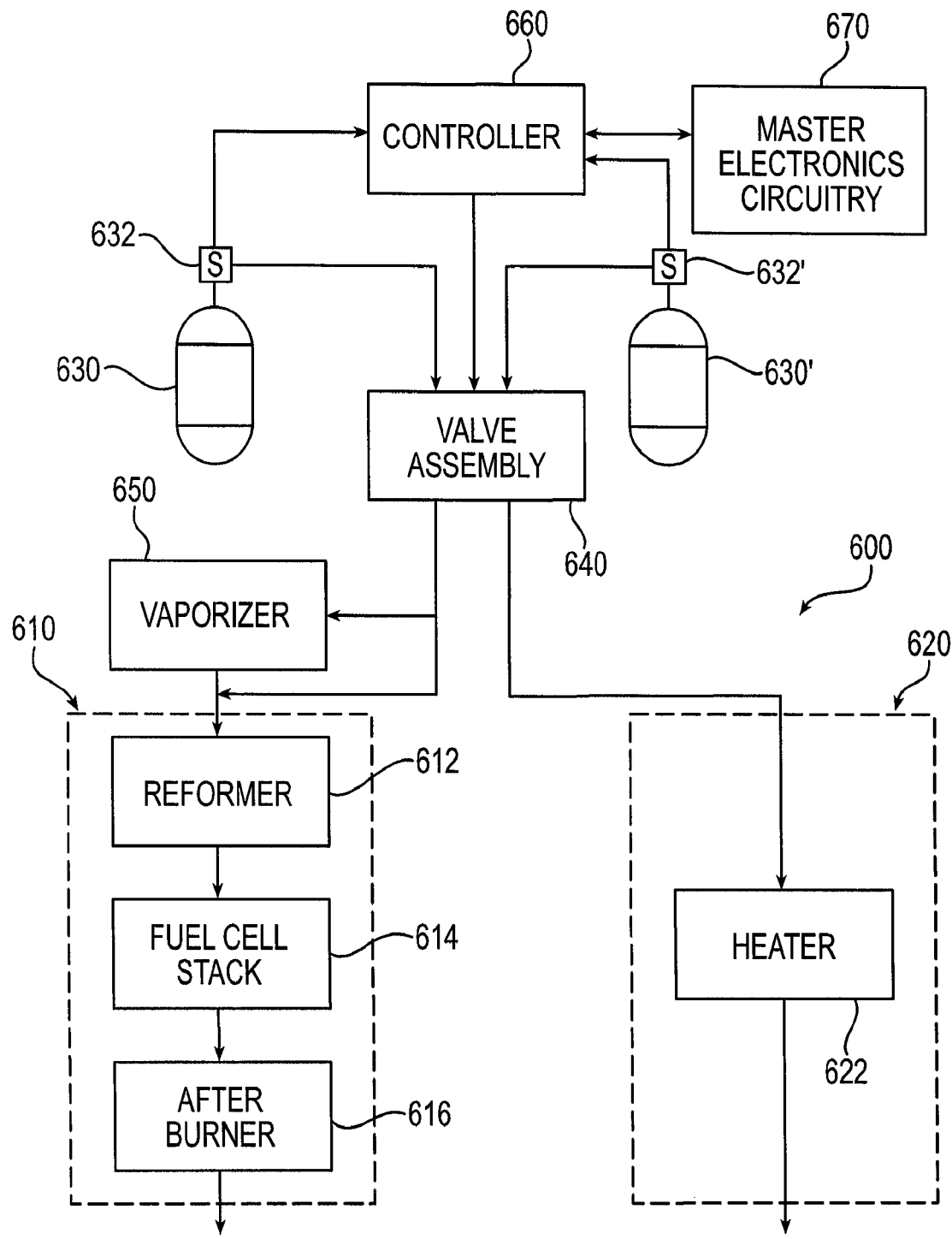
FIG. 6 illustrates a block diagram of an exemplary combined heat and power system including a fuel cell module and a heater module along with a vaporizer and two sources of reformable fuel.

FIG. 6 illustrates a block diagram of an exemplary combined heat and power system of the present disclosure. For simplicity and to avoid duplication of other figures and text, the balance of plant, circuitry electronics and related structure is not shown.

Referring to FIG. 6, the combined heat and power system 600 includes a fuel cell module 610 and a heater module 620. The fuel cell module 610 includes a reformer 612, a fuel cell stack 614, and an afterburner 616. The heater module 620 includes a heater 622. FIG. 6 also includes a first source of reformable fuel 630 and associated sensor assembly 632, a second source of reformable fuel 630' and associated sensor assembly 632', and a valve assembly 640. FIG. 6 also depicts a control system including a controller 660, and master control electronics circuitry 670.

As with all of the fuel cell modules of the present disclosure and discussed above, the fuel cell module can include a reformer in operable fluid communication with a fuel cell stack. The conversion of a gaseous or liquid reformable fuel to a hydrogen-rich carbon monoxide-containing gas mixture or hydrogen-rich reformate can be carried out using any of the well known fuel reforming operations such as steam reforming, dry reforming, autothermal reforming, and catalytic partial oxidation (CPDX) reforming.

The fuel cell stack can be in operable fluid communication with an afterburner. If a liquid reformable fuel is used, then the liquid reformable fuel can be directed to a vaporizer to create a gaseous liquid reformable fuel prior to entering the fuel cell module, for example, before entering the reformer. However, if a gaseous reformable fuel is used, then the vaporizer can be by-passed and the gaseous reformable fuel directly can enter the fuel cell module, for example, into a reformer. A valve assembly can effect such routing of the reformable fuel to one or both of the vaporizer and the reformer.

It should be understood that a fuel cell module, a heater module and a combined heat and power system of the present disclosure can include one or more (e.g. a plurality) of conduits positioned to provide operable fluid communication between or among components of the modules and/or system. A plurality of conduits can couple modules to a system as well as couple the module components themselves. That is, the components of the modules, systems and methods of the present disclosure including peripheral components and devices can include conduits connecting or linking the components, for example, a fuel cell module, a heater module, one or more sources of reformable fuel, a vaporizer, a reformer, a fuel cell stack, an afterburner, a heater, one or more valve assemblies, and related equipment such as pumps and sensors. Each of these components and others can include one or more of an inlet, an outlet, and a port to permit fluid communication, for example, operable fluid communication, to be established between or among the components. It also should be understood that the conduits can include other components and devices associated therewith, for example, valve assemblies and sensors.

The conduits or conduit system can have many specific designs, configurations, arrangements, and connections depending on many factors, for example, the particular application, the reformable fuels, and the footprint size of the modules and/or combined heat and power system. Thus, the conduit systems described and/or shown herein are merely for illustrative purposes and not meant to limit the present disclosure in any way. Moreover, where two or more conduits can be described as connected to, coupled to, or otherwise joining a component or components, for example, a source of reformable fuel to a vaporizer via a valve assembly, a single conduit also can be envisioned as achieving the same design and/or purpose, where the component such as a valve assembly can be described as being "in-line with," "situated within," or "associated with" a single conduit.

In various embodiments, at least two sources of reformable fuel can be present to provide reformable fuel to the fuel cell module and/or vaporizer and/or the heater module. The source of reformable fuel can include a drum, barrel, tank such as a pressurized tank, or other container for storage and/or delivery of the reformable fuel to the desired component(s), for example, to a vaporizer, a reformer of a fuel cell module and/or a heater of a heater module.

If a liquid reformable fuel is used, a pump can be associated with, for example, be in operable fluid communication with, the source of reformable fuel to deliver the liquid reformable fuel to the vaporizer. Examples of a pump such as a liquid pump or fuel pump include a metering pump, a rotary pump, an impeller pump, a diaphragm pump, a peristaltic pump, a positive displacement pump, a gear pump, a piezoelectric pump, an electrokinetic pump, an electroosmotic pump, and a capillary pump.

A valve assembly can provide operable fluid communication among the first and second sources of reformable fuel and the vaporizer and/or the reformer of the fuel cell module and/or the heater of the heater module.

A control system can be in communication with the valve assembly to automate the operations of the valve assembly. The control system can include a controller in communication with one or more sensor assemblies, for example, a sensor assembly associated with a source of reformable fuel. The controller can be in communication with the master control electronics circuitry, which can control the operation of the overall system. In response to input signals from the sensors, user commands from a user-input device, and/or programmed subroutines and command sequences, a controller can manage the operations of the valve assembly.

In operation, a sensor assembly associated with one source of reformable fuel, for example, a first source of reformable fuel, can monitor the level or amount of reformable fuel (or the contents) in a source of reformable fuel. When the level or amount of reformable fuel (or the contents) reaches a predetermined level, for example, 5%, 10% or 15%, the valve assembly can control or adjust the flow of reformable fuel from the first source of reformable fuel to a second or other source of reformable fuel to maintain constant operation of the fuel cell module or system, or of the combined heat and power system. The sensor assembly associated with a source of reformable fuel can measure, determine and/or monitor any parameter and characteristic indicative of the level or amount (and/or quality) of reformable fuel present or remaining in the source of reformable fuel. For example, a sensor assembly can measure, determine and/or monitor a source of reformable fuel based on its weight, its output pressure, the chemical composition of its output, and combinations thereof.

The reformable fuel remaining in the depleted first source of reformable fuel or any other depleted source of reformable fuel typically has a higher concentration of sulfur. Accordingly, simply refilling the depleted source of reformable fuel with fresh reformable fuel will not remove the sulfur from the source of reformable fuel. Consequently, repeated refilling of a depleted source of reformable fuel can increase the sulfur content of the reformable fuel in that source of reformable fuel. Because sulfur poisons the catalysts of a fuel cell stack, for example, the nickel catalysts, the presence of sulfur in a reformable fuel is undesirable and deleterious to operation of the fuel cell module and overall system.

In accordance with the present disclosure, rather than refilling the depleted source of reformable fuel after switching to another source of reformable fuel, the valve assembly can redirect or flow the remaining contents of the depleted first source of reformable fuel to a heater of a heater module to generate heat from the remaining contents of the depleted source of reformable fuel. In this way, undesirable compounds such as sulfur can be reduced or removed from the depleted source of reformable fuel before refilling with fresh reformable fuel. In addition, such a system design and operation is more energy efficient because the system uses the remaining contents of the depleted source of reformable fuel to generate heat. Such arrangements of components and methods of operating a combined heat and power system can increase the overall energy efficiency of the system as well as its operable lifetime.

The systems and methods described herein can provide a user with the ability to adjust the system electrical and heat capacity by adding, removing or replacing modules or simply by shutting down modules. If, once a system has been installed, additional capacity becomes necessary, modules can be installed into any empty module receiving location or higher capacity modules can replace existing modules to increase electrical or heat output. Likewise, if once a system has been installed, less capacity is necessary, the size and number of modules also can be changed to reduce capacity.

Additionally, on a manufacturing floor, the systems allow for ease of production because their expandability requires little changeover when assembling different size units and does not require new training for assembly. Once the manufacturing line is in operation, the assembly procedure is substantially the same, regardless of the size of the fuel cell.

Although the present disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, and the like), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present disclosure. In addition, while a particular feature of the present disclosure can have been described above with respect to only one or more of several illustrated embodiments, such feature can be combined with one or more other features of the other embodiments, as can be desired and advantageous for any given or particular application.

What is claimed is:

1. A method of operating a combined heat and power fuel cell system, the method comprising:
    flowing a reformable fuel from a first source of reformable fuel to a fuel cell stack or a reformer of a fuel cell module of a combined heat and power fuel cell system, or to a vaporizer in operable fluid communication with the fuel cell stack and/or the reformer of the fuel cell module;
    determining the amount of reformable fuel remaining in the first source of reformable fuel;
    switching to and flowing a reformable fuel from a second source of reformable fuel to at least one of the fuel cell stack, the reformer and the vaporizer when the amount of reformable fuel in the first source of reformable fuel is at or below a predetermined amount; and
    flowing the remaining contents of the first source of reformable fuel to a heater module of the combined heat and power fuel cell system to generate heat.

2. The method of claim 1, wherein a sensor assembly is associated with the first source of reformable fuel and determines the amount of reformable fuel remaining.

3. The method of claim 1, wherein a valve assembly is associated with the first source of reformable fuel; the second source of reformable fuel; at least one of the fuel cell stack, the reformer and the vaporizer; and the heater module; and the valve assembly controls the flow of reformable fuel from the first source of reformable fuel and from the second source of reformable fuel.

4. The method of claim 2, wherein a valve assembly is associated with the first source of reformable fuel; the second source of reformable fuel; at least one of the fuel cell stack, the reformer and the vaporizer; and the heater module; and the valve assembly controls the flow of reformable fuel from the first source of reformable fuel and from the second source of reformable fuel.

5. The method of claim 3, wherein a controller is in communication with the valve assembly and manages the operations of the valve assembly.

6. The method of claim 4, wherein a controller is in communication with the valve assembly and manages the operations of the valve assembly.

7. The method of claim 5, wherein the controller is in communication with the sensor assembly and responds to input signals from the sensor assembly.

8. The method of claim 6, wherein the controller is in communication with the sensor assembly and responds to input signals from the sensor assembly.

9. The method of claim 5, wherein the controller is in communication with a master control electronics circuitry.

10. The method of claim 6, wherein the controller is in communication with a master control electronics circuitry.

11. The method of claim 7, wherein the controller is in communication with a master electronics circuitry.

12. The method of claim 8, wherein the controller is in communication with a master control electronics circuitry.

13. The method of claim 2, wherein a valve assembly provides operable fluid communication among the first and second sources of reformable fuel and the vaporizer and/or the reformed of the fuel cell module and/or a heater module.

14. The method of claim 2, wherein a control system includes a controller, and in which the controller is in communication with one or more sensor assemblies.

15. The method of claim 13, wherein a control system includes a controller, and in which the controller is in communication with one or more sensor assemblies.

16. The method of claim 14, wherein the controller is in communication with a sensor assembly associated with the source of reformable fuel.

17. The method of claim 15, wherein the controller is in communication with a sensor assembly associated with the source of reformable fuel.

18. The method of claim 14, wherein the controller manages the operations of the valve assembly in response to input signals from the one or more sensor assemblies, user commands from a user-input device, and/or programmed subroutines and command sequences.

19. The method of claim 15, wherein the controller manages the operations of the valve assembly in response to input signals from the one or more sensor assemblies, user commands from a user-input device, and/or programmed subroutines and command sequences.

20. The method of claim 16, wherein the controller manages the operations of the valve assembly in response to input signals from the one or more sensor assemblies, user commands from a user-input device, and/or programmed subroutines and command sequences.

* * * * *